United States Patent
Ekambaram et al.

(10) Patent No.: US 9,575,876 B2
(45) Date of Patent: *Feb. 21, 2017

(54) PERFORMANCE TESTING OF SOFTWARE APPLICATIONS

(71) Applicant: International Business Machines Corporation, Armonk, NY (US)

(72) Inventors: Vijay Ekambaram, Chennai (IN); Vikrant Nandakumar, Bangalore (IN); Nitendra Rajput, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 255 days.

This patent is subject to a terminal disclaimer.

(21) Appl. No.: 14/304,085

(22) Filed: Jun. 13, 2014

(65) Prior Publication Data

US 2015/0363297 A1 Dec. 17, 2015

(51) Int. Cl.
*G06F 9/44* (2006.01)
*G06F 9/45* (2006.01)
(Continued)

(52) U.S. Cl.
CPC ...... *G06F 11/3688* (2013.01); *G06F 11/3616* (2013.01); *G06F 11/3664* (2013.01); *G06F 11/3414* (2013.01); *G06F 11/3604* (2013.01)

(58) Field of Classification Search
CPC ........ G06F 9/5027; G06F 9/5077; G06F 8/70; G06F 11/3688; G06F 11/3684;
(Continued)

(56) References Cited

U.S. PATENT DOCUMENTS

| 8,538,897 B2 | 9/2013 | Han et al. |
| 2006/0053422 A1* | 3/2006 | Alikacem ........... G06F 11/3668 718/100 |

(Continued)

FOREIGN PATENT DOCUMENTS

| EP | 2600250 A1 | 6/2013 |
| WO | 2004064431 A2 | 7/2004 |
| WO | 2013119205 A1 | 8/2013 |

OTHER PUBLICATIONS

Tse-Hsun Chen et al., Detecting Performance Anti-Patterns for Applications Developed using Object-Relational Mapping, May 31, 2014, ACM 978-1-4503-2756-5/14/05, [Retrieved on Apr. 15, 2016]. Retrieved from the internet: <URL: http://www.cse.yorku.ca/~zmjiang/publications/icse2014_chen.pdf> 12 pp. 1-12.*

(Continued)

*Primary Examiner* — Thuy Dao
*Assistant Examiner* — Anibal Rivera
(74) *Attorney, Agent, or Firm* — Arnold B. Bangali (57) ABSTRACT

Identifying performance issues in an application under test (AUT). The AUT executes on a system under test (SUT) in a test environment, and uses one or more context parameters of the SUT and/or the test environment. A rule engine identifies performance antipatterns in trace data generated by the AUT when executing a set of test suites, based on a set of performance antipattern definition rules, each performance antipattern associated with one or more context parameters. One or more performance test suites are identified that cause the AUT to use at least one of the one or more context parameters associated with the identified antipatterns. The list of identified performance test suites is ranked, based on respective priority values associated with each identified antipattern.

10 Claims, 4 Drawing Sheets

(51) Int. Cl.
*G06F 11/36* (2006.01)
*G06F 11/34* (2006.01)

(58) Field of Classification Search
CPC .............. G06F 11/3672; G06F 11/323; G06F 11/3414; G06F 11/263; G06F 11/3616; G06F 11/30985; G06F 11/3668; G06F 11/3604; G06F 11/3452
See application file for complete search history.

(56) References Cited

U.S. PATENT DOCUMENTS

| | | | |
|---|---|---|---|
| 2006/0129992 A1 | 6/2006 | Oberholtzer et al. | |
| 2006/0167866 A1* | 7/2006 | Farchi | G06F 11/3604 |
| 2006/0174162 A1* | 8/2006 | Varadarajan | G06F 11/263 |
| | | | 714/38.14 |
| 2009/0045950 A1* | 2/2009 | Miller | G08B 21/12 |
| | | | 340/540 |
| 2009/0048690 A1* | 2/2009 | Miller | G06N 5/04 |
| | | | 700/54 |
| 2009/0235172 A1* | 9/2009 | Gandhi | G06F 11/3688 |
| | | | 715/733 |
| 2011/0022551 A1* | 1/2011 | Dixon | G06F 11/3616 |
| | | | 706/12 |
| 2011/0078106 A1* | 3/2011 | Luchi | G06F 11/3452 |
| | | | 706/48 |
| 2011/0265064 A1* | 10/2011 | Hadar | G06F 17/30985 |
| | | | 717/121 |
| 2012/0173187 A1* | 7/2012 | Lee | G06F 11/3414 |
| | | | 702/123 |
| 2012/0253745 A1* | 10/2012 | Dhanapal | G06F 11/3688 |
| | | | 702/186 |
| 2013/0080634 A1 | 3/2013 | Grelewicz et al. | |
| 2015/0066433 A1* | 3/2015 | Nagarajan | G09G 3/006 |
| | | | 702/186 |

OTHER PUBLICATIONS

Trevor Parsons, Automatic Detection of Performance Design and Deployment Antipatterns in Component Based Enterprise Systems, Nov. 2007, [Retrieved on Apr. 15, 2016]. Retrieved from the internet: <URL: http://citeseerx.ist.psu.edu/viewdoc/download-?doi=10.1.1.120.2991&rep=rep1&type=pdf> 192 pp. 1-180.*
Connie U. Smith et al., New Software Performance Antipatterns: More Ways to Shoot Yourself in the Foot, 2002, [Retrieved on Aug. 14, 2016]. Retrieved from the internet: <URL: http://spe-ed.com/papers/moreanti.pdf> 8 pp. 1-8.*
H.H. Hallal et al., Antipatterns-based Detection of Deficiencies in Java Multithreaded Software, Sep. 2004 IEEE, [Retrieved on Aug. 14, 2016]. Retrieved from the internet: <URL: http://ieeexplore.ieee.org/stamp/stamp/jsp?tp=&arnumber=1357968> 10 pp. 1-10.*
IBM, "List of IBM Patents or Patent Applications Treated as Related (Appendix P)," Oct. 21, 2014.
Ekambaram et al., "Performance Testing of Software Applications," Filed on Oct. 21, 2014, p. 1-30, U.S. Appl. No. 14/519,461.
Kakousis et al, "Testing self-adaptive applications with simulation of context events," Electronic Communications of the EASST, 2010, p. 1-12, vol. 28, Proceedings of the Third International DisCoTec Workshop on Context-Aware Adaptation Mechanisms for Pervasive and Ubiquitous Services.
Kim et al, "Performance Testing of Mobile Applications at the Unit Test Level," IEEE, 2009, p. 171-180, Third IEEE International Conference on Secure Software Integration and Reliability Improvement.
Liu et al, "Scalable Context Simulation for Mobile Applications," OTM Workshops, 2006, p. 1391-1400, LNCS 4278, Springer-Verlag, Berlin Heidelberg.
Parsons et al, "Detecting Performance Antipatterns in Component Based Enterprise Systems," Journal of Object Technology, Mar.-Apr. 2008, p. 55-90, vol. 7, No. 3.
Saxena, "Mobile App Performance Testing With Perfecto MobileCloud Performance," Tools Journal, Aug. 5, 2013, p. 1-4.
Wilson et al, "Techniques for Testing Performance/Scalability and Stress-Testing ADF Applications," An Oracle White Paper, Mar. 2011, p. 1-21, Oracle Corporation, USA.
Smith et al., "New Software Performance AntiPatterns: More Ways to Shoot Yourself in the Foot", Performance Engineering Services and Software Engineering Research, 2002, pp. 1-8.
Hallal et al., "Antipattern-based Detection of Deficiencies in Java Multithreaded Software", Proceedings of the Fourth International Conference on Quality Software, (QSIC'04), Sep. 2004 IEEE, pp. 1-10.

* cited by examiner

PERFORMANCE TESTING OF SOFTWARE APPLICATIONS

BACKGROUND

The present invention relates generally to the field of software development and testing, and more particularly to identifying effective test suites for software performance testing.

Software testing may involve two aspects: functional testing, and performance testing. Functional testing, more commonly referred to simply as "debugging," tests that the software properly performs all design functionality. Functional testing is typically performed by executing functional test suites that attempt to exercise every execution path in the software to determine that each path executes correctly with the desired results.

Performance testing assumes that the software functions properly, and attempts to identify software performance issues, or performance antipatterns, which are often related to the physical environment in which the software executes. Performance antipatterns may include reduced throughput, reduced response time, software crashes, etc. Performance antipatterns may often be identified by exercising the software in resource constrained environments. For example, a software application is exercised in an environment in which memory resources available to the application are purposely reduced. In this environment, the application exhibits performance antipatterns, such as unacceptable response time, or crashing. This may indicate that the application, properly or improperly, requires excessive memory resources. An analysis may be performed to identify the cause of the excessive memory usage, and the software may be refactored to address the antipattern. Similar to functional testing, performance test suites may be executed that create particular environments in which certain resources, individually or in combination, are purposely constrained or made available. Each such environment may be referred to as a context, and aspects of the test environment accessed or used by the test suite may be referred to as context parameters.

SUMMARY

Embodiments of the present invention disclose a method, computer program product, and system for identifying performance issues in an application under test (AUT). The AUT executes on a system under test (SUT) in a test environment, and uses one or more context parameters of the SUT and/or the test environment. A rule engine identifies performance antipatterns in trace data generated by the AUT when executing a set of test suites based on a set of performance antipattern definition rules, each performance antipattern associated with one or more context parameters. One or more performance test suites are identified that cause the AUT to use at least one of the one or more context parameters associated with the identified antipatterns. The list of identified performance test suites is ranked, based on respective priority values associated with each identified antipattern.

DETAILED DESCRIPTION

In software performance testing, many applications may operate in relatively simple environments. For example, the test environment of a mainframe or personal computer may include only a few resources, such as memory, CPU, storage, and a network. A performance test suite to exercise an application operating in this environment may require relatively few contexts. For such applications, performance testing may reasonably include exercising the software in all the defined contexts each time performance testing is performed.

In contrast, certain applications operate in comparatively complicated environments in which many resources, sensors, devices, etc., which may be collectively referred to herein as context parameters, are used. For example, mobile phone context parameters may include CPU, memory, storage, and, of course, telephony services, but may also include touchscreen, WiFi, ad hoc network capability (e.g., Bluetooth®, near field communication, etc.), GPS, accelerometers, cameras, and other resources and sensors. Other application environments that may include many context parameters include, for example, modern automobiles and jet aircraft. For these environments, a large number of contexts may be required to define all combinations and levels of parameters a software application executing in one of these environments may encounter. To conduct software performance testing in all contexts may require an unacceptably long time.

In addition, functional testing and performance testing are traditionally performed as separate functions. For example, after a series of functional test suites has been executed and all identified functional bugs have been addressed, a performance testing begins, and a series of performance test suites may be executed to identify and address performance antipatterns.

Embodiments of the invention recognize that it would be advantageous to identify performance test suites that use contexts in which application performance antipatterns are occurring. In various embodiments, analysis of data produced during functional testing of an application may identify the context parameters the application actually uses. This information may then be used to identify the performance test suites to those having contexts in which performance antipatterns have occurred.

Based on developer input, rules of thumb, and other heuristic approaches, antipatterns may be ranked or prioritized based, for example, on whether the antipatterns are most likely to cause significant performance impacts. Based on this antipattern ranking, performance test suites identified as having contexts in which performance antipatterns have occurred may be prioritized such that they are performed first. In addition, embodiments of the invention recognize that it would be advantageous to take advantage, during the performance testing phase, of performance information gleaned during functional testing. Such information may, for example, assist in identifying an initial set of contexts to test.

Figure 1:
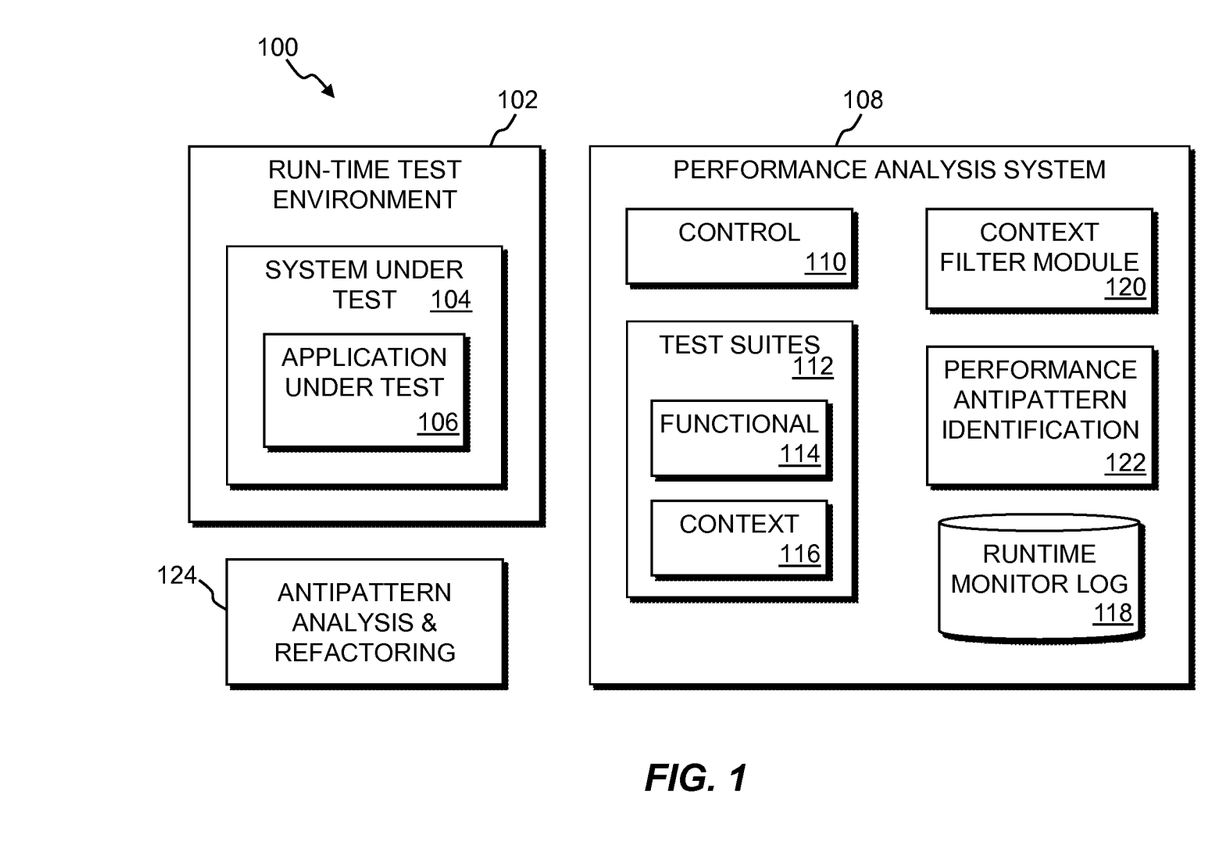
FIG. 1 is a functional block diagram illustrating an application performance analysis environment, in accordance with an embodiment of the present invention.

FIG. 1 is a functional block diagram illustrating an application performance analysis environment 100, in accordance with an embodiment of the present invention. Application performance analysis environment 100 may include run-time test environment 102, performance analysis system 108, and antipattern analysis and refactoring 124.

Run-time test environment 102 may include system under test (SUT) 104, which may further include application under test (AUT) 106. In an exemplary embodiment, SUT 104 may be a mobile phone, for example, a mobile phone as described in relation to FIG. 4, and AUT 106 may be an application that executes on the mobile phone, for example, an application program 432.

Figure 4:
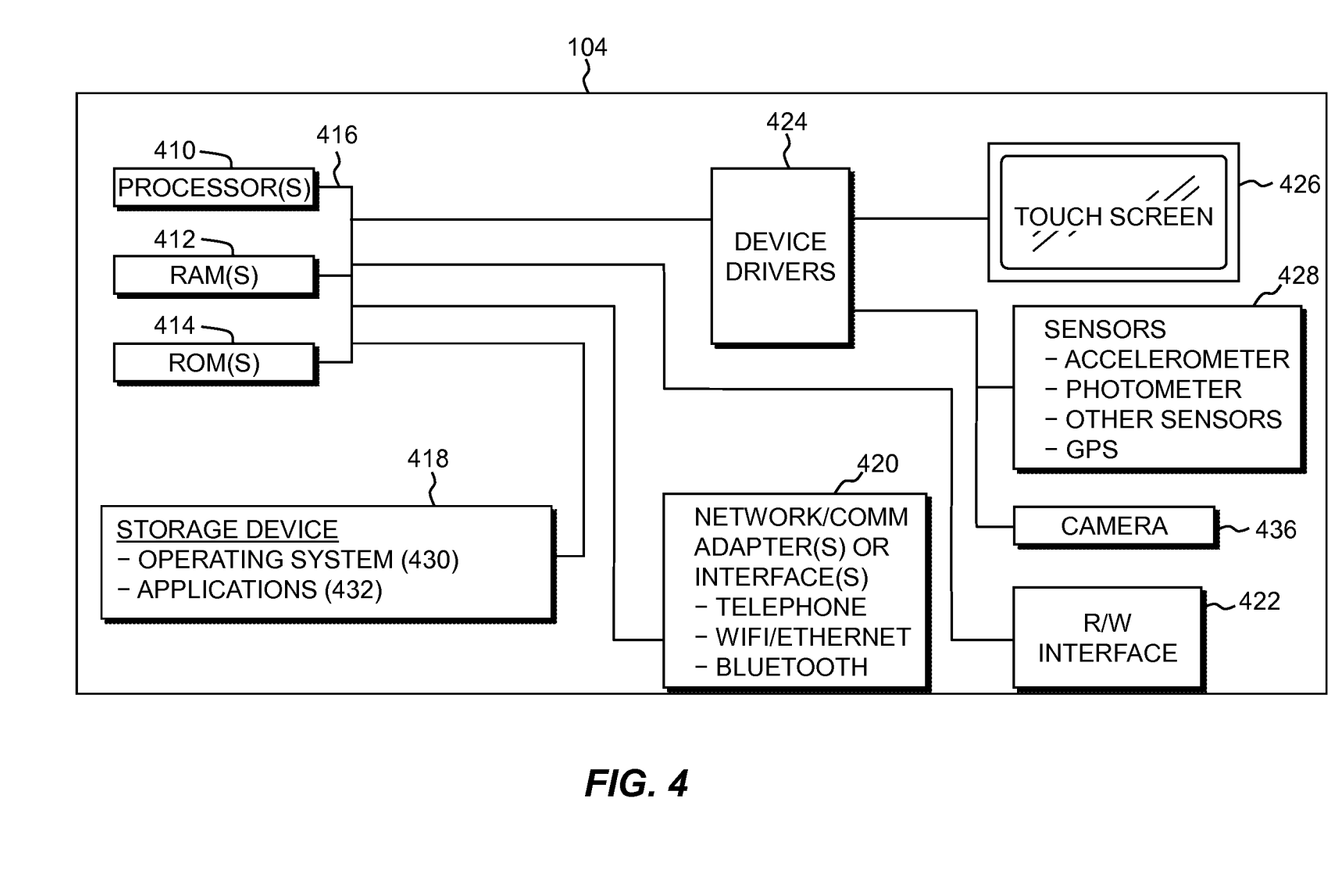
FIG. 4 is a functional block diagram of components of an exemplary system under test, in accordance with an embodiment of the present invention.

As illustrated in FIG. 4, which is described in more detail below, mobile phone SUT 104 may include several computing resources, such as processor(s) 410, RAM 412 and ROM 414, and storage device 418. Mobile phone SUT 104 may also include numerous sensors 428. A representative non-exclusive list of sensors 428 may include: a GPS sensor, an accelerometer, a photometer, which could be integrated into the mobile phone's camera 436, a thermometer, a barometer, a hygrometer. In general, sensors 428 may represent any device that measures a physical quantity in the environment of mobile phone SUT 104, and produces signals representative of the physical quantity measured. Although not a sensor in the strict sense, satellite navigation system capability, such as GPS, is included here for convenience. Mobile phone SUT 104 may also include various devices, such as touch screen 426, camera 436, and other devices, such as signal lights, signal speakers, flashlights, etc.

Mobile phone SUT 104 may further include network and communication adapters or interfaces 420. These interfaces and adapters may allow communication over various networks and protocols, for example, TDMA, CDMA, GSM, and/or other mobile telephone standards, WiFi, Ethernet, Bluetooth, NFC, and other infrastructure based and ad hoc wireless protocols.

Returning to FIG. 1, the above-indicated context parameters may be available to an application, for example, AUT 106, executing on a mobile phone, such as mobile phone SUT 104, directly via programming language statements, or indirectly via APIs or other application programming interfaces.

Run-time test environment 102 represents the context in which an application, for example, AUT 106, executes. Run-time test environment 102 includes the specific test case settings for all the context parameters discussed above, and also may include environmental settings in which SUT 104 is operating in, such as temperature, humidity, brightness, EMI, and other conditions that can affect the execution and operation of AUT 106. In various embodiments, all context parameters may be controlled and set to a desired setting, state, condition, etc., as is known in the art.

Performance analysis system 108 may include control module 110, test suites 112, context filter module 120, performance antipattern identification module 122, and run-time monitor log 118. Performance analysis system 108 may execute on a computer system, for example, the computer system described below in relation to FIG. 5. Control module 110 generally controls the operation of the various aspects of performance analysis system 108.

Test suites 112 include functional test suites 114, and context test suites 116. In various embodiments, execution of a test suite 112 may be wholly or partially traced, with the trace logging written to runtime monitor log 118. A test suite 112 may include one or more test cases. Those of skill in the art will recognize that numerous commercially available and open source solutions are available for execution tracing in many different software environments. For example, the Android® SDK includes the Dalvik® Debug Monitor Server (DDMS). DDMS allows for tracing the execution of software during debugging, with trace information streamed directly into a trace log file. Generally, any tracing solution in accordance with an embodiment of the invention may be used. Each test case or test suite has an associated context. In exemplary embodiments, context parameter settings and values relating to the context of a test case may be tracked with the trace data. For example, if the context includes a fading NFC signal, the signal strength at the NFC interface on mobile phone SUT 104 may be tracked.

Context filter module 120 operates to analyze the trace data in runtime monitor log 118 from the executions of test suites in functional test suites 114, and identify context parameters that are accessed by the AUT 106. Context filter module 120 may then identify the subset of context test suites 116 that use these context parameters. In this manner, performance testing of AUT 106 can be limited to context test suites 116 with context parameters that AUT 106 actually accesses. This filtering operation may greatly improve performance testing efficiency over more traditional approaches that may simply conduct performance testing on a fixed set of context test suites, regardless of whether the AUT actually accesses context parameters in a specific test case.

Figure 2:
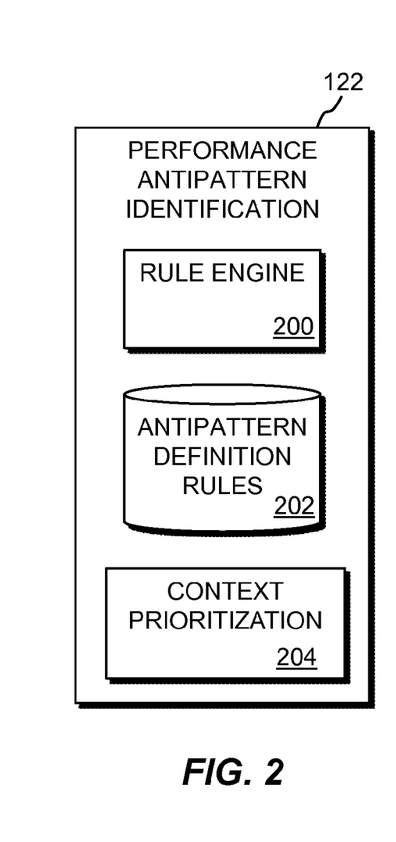
FIG. 2 is a functional block diagram illustrating components of a performance antipattern identification module within the application performance analysis environment of FIG. 1, in accordance with an embodiment of the present invention.

FIG. 2 is a functional block diagram illustrating components of a performance antipattern identification module 122 within performance analysis system 108 (FIG. 1), in accordance with an embodiment of the present invention. Performance antipattern identification module 122 operates to analyze the trace data in runtime monitor log 118 from the executions of test suites 112, and identify performance antipatterns in the data. Based on the identified performance antipatterns, performance antipattern identification module 122 may determine a set of context test suites 116 to execute on AUT 106 that will access the context parameters associated with the identified performance antipatterns. Performance antipattern identification module 122 may prioritize, or rank, the identified context test suites 116, based on priority values associated with each antipattern. Context test suites 116 may also be ranked based on a pattern of identified antipatterns. For example, if one or more context parameters associated with the identified antipatterns are also associated with one or more context test suites, these test suites may be given a higher ranking.

In exemplary embodiments, performance antipattern identification module 122 includes a rule engine 200, antipattern definition rules 202, and context prioritization module 204. Rule engine 200 operates generally to detect antipatterns in the test suite 112 trace data in runtime monitor log 118, based on antipattern definition rules 202. Rules 202 may be defined that describe the performance antipatterns in terms of the context parameter usage values. When a rule's condition clauses are met in the trace data, the rule's action clause fires, which may, for example, notify that an identified antipattern was detected in the trace data. As mentioned above, performance antipatterns may be defined, for example, based on developer input, rules of thumb, correlation analysis of trace data, and other heuristic approaches. Numerous glossaries of performance patterns are also known in the art.

A non-exclusive list of antipatterns for AUT 106 executing on mobile phone SUT 104 may include the following:

- Memory usage of an application increases linearly or exponentially during the execution of a test case. This may indicate that the AUT suffers from memory leaks, which may cause the AUT, and other executing applications, to hang or crash.
- CPU usage of an AUT experiences frequent spikes. This may indicate that the AUT will suffer performance or response issues when other applications are active on the SUT.
- Network utilization of an AUT occurs primarily in the main user interface thread of the AUT. This may indicate that the AUT may fail if its network interface experiences a slow response.
- Significant execution time occurs in the main user interface thread. This may cause the application to hang for unacceptably long periods of time.
- High memory usage (as may be defined specific to a SUT). This may cause the AUT, and other executing applications, to crash or hang.
- A background service is started by an AUT but is not explicitly stopped. This may result in memory not being freed upon AUT exit, which may impact performance of other executing applications.
- Wake locks or set in a background service. This may result in activation of the mobile phone display screen, or preventing the display screen from turning off, which may lead to excessive power drain on the mobile phone battery.
- Loading images without scaling. This may result in excessive load times and excessive memory use.
- Not releasing the references of objects as soon as the object purpose is over. This may result in a minor performance impact. However, instances of many such antipatterns may aggregate to cause a significant performance impact.
- Periodic network transfers. This may result in a mobile radio unnecessarily remaining in a high power state, which may cause a drain on the mobile phone battery.
- Code patterns which violate best practices rules. Depending on the violation, there may be significant performance impacts. Stated another way, cleanup of such violations may result in a significant performance improvement.

Each of these antipatterns may be described by a set of condition statements in an antipattern definition rule 202. If rule engine 200 determines that all conditions of a rule 202 are met in the trace data, the rule will fire.

In various embodiments, each antipattern definition rule 202 has an associated priority value, for example, a 1-to-10 rating, high, medium, low, must test context, good to test context, etc. Antipattern priority is generally based on the performance impact of an antipattern on the AUT or SUT. For example, an antipattern that may result in an AUT crash, or have the potential to significantly impact other executing applications, may have a high priority value. Antipattern priority may also be based on severity of the antipattern impact to performance of the AUT and/or the SUT, and the severity of the antipattern impact to AUT software code maintainability. Antipatterns that result in minor performance impacts may have low priority values. The priority of an antipattern definition rule 202 may be based on the specific SUT and AUT, on design and quality of service requirements, and other considerations.

Each antipattern definition rule 202 also has an associated context. Context prioritization module 204 may operate to identify context test suites 116 that access context parameters implicated in the antipattern definition rules 202 that have fired, and determine a priority in which to execute the identified context test suites, based on the antipattern definition rule priority values.

In certain embodiments, an antipattern definition rule 202 priority may be adjusted by context prioritization module 204 based on how identified antipatterns may interact to impact AUT or SUT performance. For example, if several antipatterns are identified that all use a certain context parameter, for example, memory, all context test suites that exercise memory may be identified as high priority test suites.

As mentioned above, functional test suites 114 (FIG. 1) may be used primarily to provide high code coverage functional testing of AUT 106. However, in various embodiments of the invention, information produced during execution of a series of functional test suites 114 may also be used during the software performance testing phase. For example, various functional test suites may be executed in a standard high availability context in which all resources, sensors, devices, etc., are not constrained and are available to AUT 106. In another example, various functional test suites may be executed in a context-parameter-constrained environment—however, not so constrained that functional testing is unacceptably impacted. After context filter module 120 has identified the context parameters that are accessed by the AUT 106 during the functional testing phase, and identified the subset of context test suites 116 that use these context parameters, performance antipattern identification module 122 may perform an initial analysis of the trace data to determine an initial prioritization of the identified context test suites 116. In these embodiments, a different set of antipattern definition rules 202 may be used by rule engine 200 to identify performance antipatterns in the functional test suite trace data. In this manner, overall testing efficiencies may be gained by taking advantage of performance related information generated during the functional testing phase.

Figure 3:
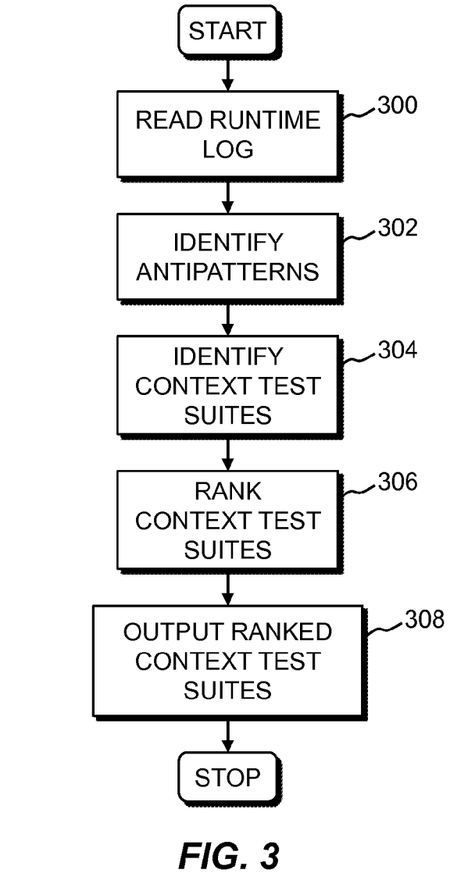
FIG. 3 is a flowchart depicting operational steps of the performance antipattern identification module, in accordance with an embodiment of the present invention.

FIG. 3 is a flowchart depicting operational steps of performance antipattern identification module 122, in accordance with an embodiment of the present invention. Rule engine 200 reads test suite trace files written to runtime monitor log 118 (step 300). Based on antipattern definition rules 202, antipatterns in the trace files are identified by rule engine 200 (step 302). When all antipatterns in the trace files have been identified, context prioritization module 204 identifies context test suites 116 that access the context parameters that are associated with the identified test suites (step 304). The identified context test suites are then ranked by context prioritization module 204, based on the priorities associated with each antipattern definition rule 202 that fired (step 306). A report listing the ranked context test suites may be output for the system testers (step 308) to use in refactoring the software of AUT 106, and in performing additional performance testing. Steps 300-308 may be repeated by the system testers as desired until a satisfactory low level of performance antipattern identification is achieved.

Antipattern analysis and refactoring 124 represents the iterative work that may be performed, for example, by system testers, in analyzing the ranked context test suite report generated by performance analysis system 108, and in refactoring of the software of AUT 106 to reduce to a satisfactory level performance antipatterns identified in subsequent executions of context test suites 116.

FIG. 4 is a block diagram of components of a mobile phone SUT 104, in accordance with an embodiment of the present invention. In an exemplary embodiment, mobile phone 104 includes one or more processors 410, one or more computer-readable RAMs 412, one or more computer-readable ROMs 414, and one or more computer-readable storage devices 418 on one or more buses 416. One or more operating systems 430 and one or more applications 432 are stored on the one or more computer-readable storage devices 418 for execution by one or more of the processors 410 via one or more of the RAMs 412 (which typically include cache memory). In an exemplary embodiment, a computer-readable storage device 418 is a semiconductor storage device such as ROM, EPROM, flash memory or any other computer-readable storage device that can store a computer program and digital information.

Mobile phone 104 may also include a read/write (R/W) interface 422, for example, a USB port, to read from and write to external computing devices or one or more portable computer-readable storage devices such as a memory stick, magnetic disk, or semiconductor storage device.

Mobile phone 104 may also include network adapter(s) or interface(s) 420, such as a TDMA/CDMA telephony interface, TCP/IP adapter card or wireless communication adapter (such as a 4G wireless communication adapter using OFDMA technology), Ethernet interface, Bluetooth interface, etc.

Mobile phone 104 may also include a touch screen 426, a camera 436, and sensors 428 such as touch screen sensors and magnetically sensitive circuits. Mobile phone 104 may also include device drivers 424 to interface to touch screen 426 for imaging, and to sensors 428 for pressure sensing of alphanumeric character entry and user selections and for detecting magnetic flux and polarity. The device drivers 424, R/W interface 422 and network adapter or interface 420 comprise hardware and software (stored in computer-readable tangible storage device 418 and/or ROM 414).

It should be appreciated that FIG. 4 provides only an illustration of one implementation and does not imply any limitations with regard to the environments in which different embodiments may be implemented. Many modifications to the depicted environment may be made.

Figure 5:
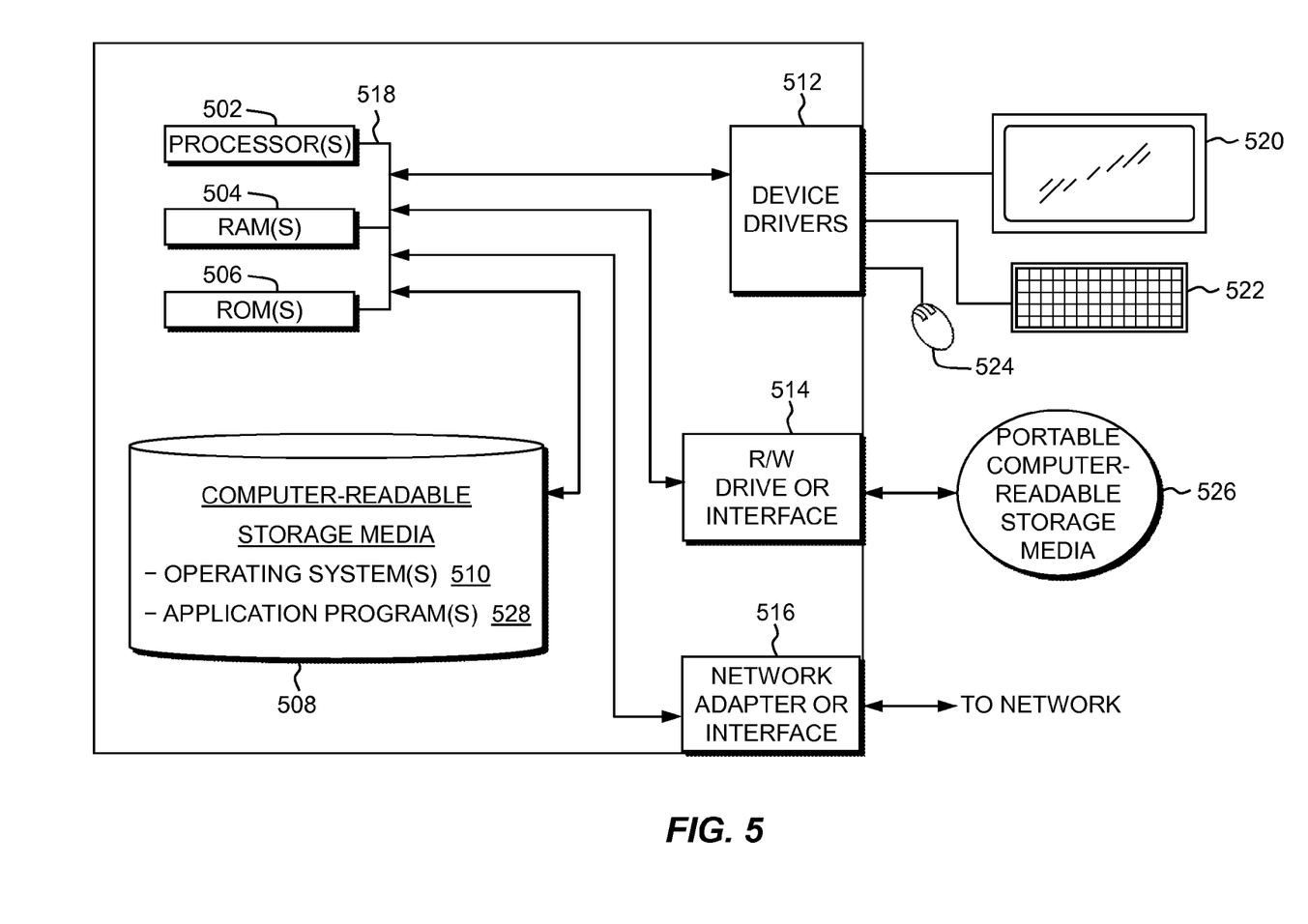
FIG. 5 is a functional block diagram of components of a computer system in which components of the application performance analysis environment may execute, in accordance with an embodiment of the present invention.

FIG. 5 depicts a block diagram of components of performance analysis system 108, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Performance analysis system 108 can include one or more processors 502, one or more computer-readable RAMs 504, one or more computer-readable ROMs 506, one or more computer-readable storage media 508, device drivers 512, read/write drive or interface 514, network adapter or interface 516, all interconnected over a communications fabric 518. Communications fabric 518 can be implemented with any architecture designed for passing data and/or control information between processors (such as microprocessors, communications and network processors, etc.), system memory, peripheral devices, and any other hardware components within a system.

One or more operating systems 510, and application programs 528, which may include, for example, control program 110, context filter module 120, and performance antipattern identification module 122, are stored on one or more of the computer-readable storage media 508 for execution by one or more of the processors 502 via one or more of the respective RAMs 504 (which typically include cache memory). In the illustrated embodiment, each of the computer-readable storage media 508 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable storage media that can store a computer program and digital information.

Performance analysis system 108 can also include a R/W drive or interface 514 to read from and write to one or more portable computer-readable storage media 526. Application programs 528 on performance analysis system 108 can be stored on one or more of the portable computer-readable storage media 526, read via the respective R/W drive or interface 514 and loaded into the respective computer-readable storage media 508.

Performance analysis system 108 can also include a network adapter or interface 516, such as a TCP/IP adapter card or wireless communication adapter (such as a 5G wireless communication adapter using OFDMA technology). Application programs 528 on performance analysis system 108 can be downloaded to the performance analysis system from an external computer or external storage device via a network (for example, the Internet, a local area network or other, wide area network or wireless network) and network adapter or interface 516. From the network adapter or interface 516, the programs are loaded into the computer-readable storage media 508. The network may comprise copper wires, optical fibers, wireless transmission, routers, firewalls, switches, gateway computers and/or edge servers.

Performance analysis system 108 can also include a display screen 520, a keyboard or keypad 522, and a computer mouse or touchpad 524. Device drivers 512 interface to display screen 520 for imaging, to keyboard or keypad 522, to computer mouse or touchpad 524, and/or to display screen 520 for pressure sensing of alphanumeric character entry and user selections. The device drivers 512, R/W drive or interface 514 and network adapter or interface 516 can comprise hardware and software (stored in computer-readable storage media 508 and/or ROM 506).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer program product for identifying performance issues in an application under test (AUT), the AUT executing on a system under test (SUT) in a test environment, the AUT using one or more context parameters of the SUT and/or the test environment, the computer program product comprising:
one or more computer-readable storage media and program instructions stored on the one or more computer-readable storage media, the program instructions comprising:
program instructions to identify performance antipatterns in trace data generated by the AUT when executing a set of test suites based on a set of performance antipattern definition rules, each performance antipattern associated with one or more context parameters;

program instructions to identify one or more performance test suites that cause the AUT to use at least one of the one or more context parameters associated with the identified antipatterns;

program instructions to rank a list of identified performance test suites based on respective priority values associated with each identified antipattern the priority values are based on a heuristic approach including assessing severity of an impact to performance of the AUT and/or the SUT or severity of the impact to AUT software code maintainability; and performing, by the computer, at least one test suite in the list of identified performance test suites first based on a highest priority value from the priority values in the ranking.

2. A computer program product in accordance with claim 1, wherein the one or more context parameters includes one or more of: memory, CPU processing time, storage, sensors, devices, communication interfaces, battery, touchscreen, display screen WiFi, ad hoc network, near field communication, GPS, accelerometer, camera, thermometer, hygrometer, barometer.

3. A computer program product in accordance with claim 1, wherein the program instructions to identify performance antipatterns in trace data generated by the AUT when executing a set of test suites further comprises program instructions to identify performance antipatterns in trace data generated by the AUT when executing a set of performance test suites based on a set of performance antipattern definition rules, each performance antipattern associated with one or more context parameters.

4. A computer program product in accordance with claim 1, wherein the program instructions to identify performance antipatterns in trace data generated by the AUT when executing a set of test suites further comprises program instructions to identify, by a rule engine computer, performance antipatterns in trace data generated by the AUT when executing a set of functional test suites based on a set of performance antipattern definition rules, each performance antipattern associated with one or more context parameters.

5. A computer program product in accordance with claim 1, wherein the program instructions to rank the list of identified performance test suites further comprises program instructions to rank the list of identified performance test suites, based on the number of occurrences of one or more context parameters associated with the identified antipatterns that are also associated with one or more performance test suites.

6. A computer system for identifying performance issues in an application under test (AUT), the AUT executing on a system under test (SUT) in a test environment, the AUT using one or more context parameters of the SUT and/or the test environment, the computer system comprising:

one or more computer processors, one or more computer-readable storage media, and program instructions stored on one or more of the computer-readable storage media for execution by at least one of the one or more processors, the program instructions comprising:

program instructions to identify performance antipatterns in trace data generated by the AUT when executing a set of test suites based on a set of performance antipattern definition rules, each performance antipattern associated with one or more context parameters;

program instructions to identify one or more performance test suites that cause the AUT to use at least one of the one or more context parameters associated with the identified antipatterns;

program instructions to rank a list of identified performance test suites based on respective priority values associated with each identified antipattern the priority values are based on a heuristic approach including assessing severity of an impact to performance of the AUT and/or the SUT or severity of the impact to AUT software code maintainability; and performing, by the computer, at least one test suite in the list of identified performance test suites first based on a highest priority value from the priority values in the ranking.

7. A computer system in accordance with claim 6, wherein the one or more context parameters includes one or more of: memory, CPU processing time, storage, sensors, devices, communication interfaces, battery, touchscreen, display screen WiFi, ad hoc network, near field communication, GPS, accelerometer, camera, thermometer, hygrometer, barometer.

8. A computer system in accordance with claim 6, wherein the program instructions to identify performance antipatterns in trace data generated by the AUT when executing a set of test suites further comprises program instructions to identify performance antipatterns in trace data generated by the AUT when executing a set of performance test suites based on a set of performance antipattern definition rules, each performance antipattern associated with one or more context parameters.

9. A computer system in accordance with claim 6, wherein the program instructions to identify performance antipatterns in trace data generated by the AUT when executing a set of test suites further comprises program instructions to identify, by a rule engine computer, performance antipatterns in trace data generated by the AUT when executing a set of functional test suites based on a set of performance antipattern definition rules, each performance antipattern associated with one or more context parameters.

10. A computer system in accordance with claim 6, wherein the program instructions to rank the list of identified performance test suites further comprises program instructions to rank the list of identified performance test suites, based on the number of occurrences of one or more context parameters associated with the identified antipatterns that are also associated with one or more performance test suites.

* * * * *